G. S. POWER.
FRONT HEAD FOR DRILL CYLINDERS.
APPLICATION FILED APR. 15, 1910.
974,823.
Patented Nov. 8, 1910.
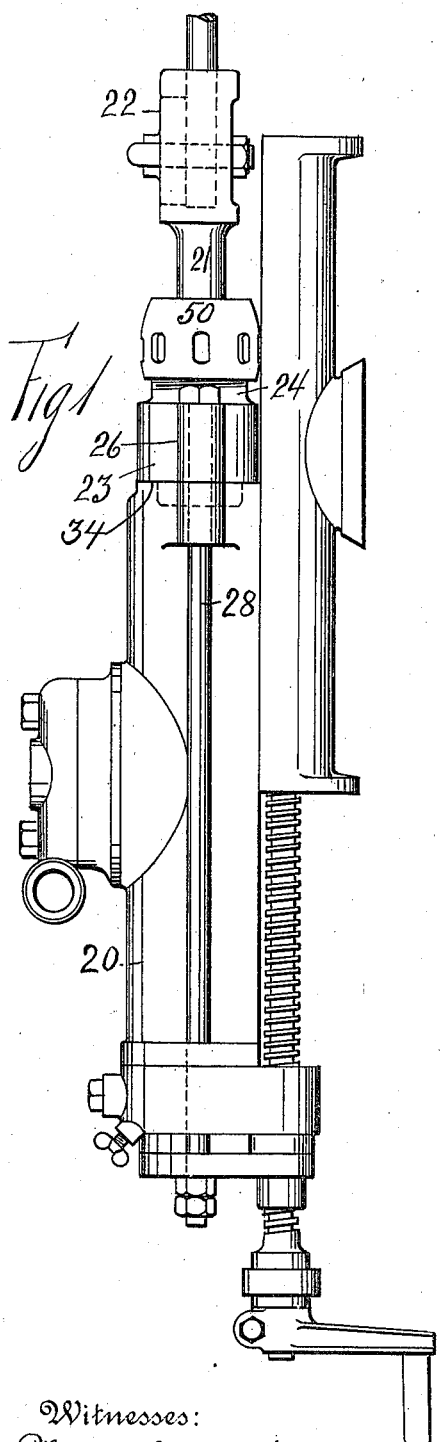
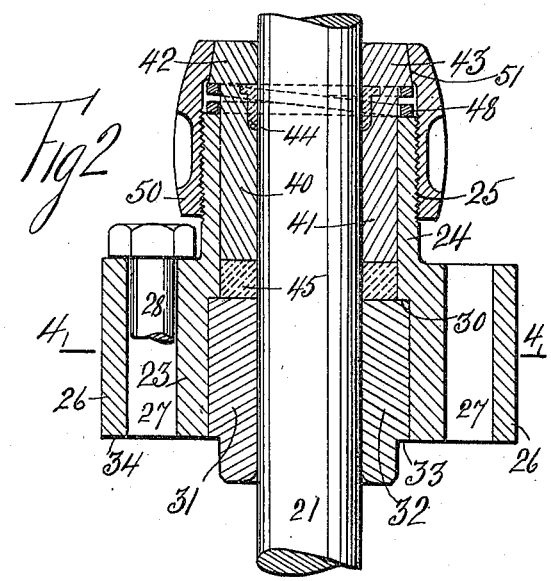
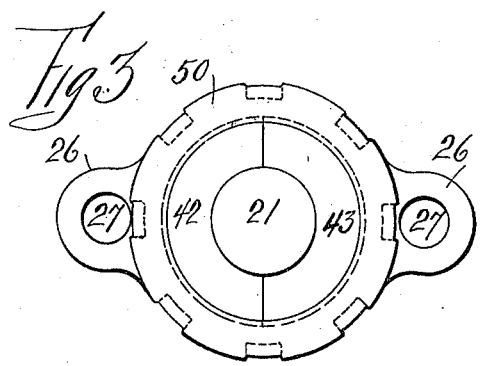
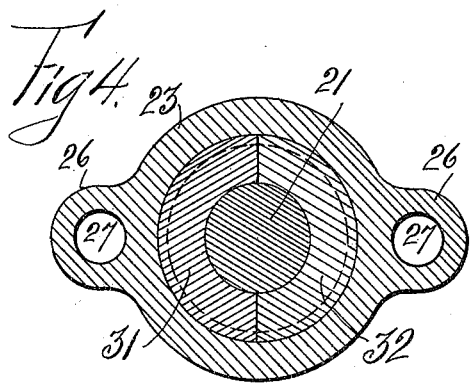
Witnesses:
Martin Zimansky
John J. Miller
Inventor
George S. Power
By his Attorney

UNITED STATES PATENT OFFICE.

GEORGE S. POWER, OF NUTLEY, NEW JERSEY.

FRONT HEAD FOR DRILL-CYLINDERS.

974,823.   Specification of Letters Patent.   Patented Nov. 8, 1910.

Application filed April 15, 1910. Serial No. 555,596.

*To all whom it may concern:*

Be it known that I, GEORGE S. POWER, a citizen of the United States, and resident of Nutley, in the county of Essex and State of New Jersey, have invented certain new and useful Improvements in Front Heads for Drill-Cylinders, of which the following is a specification.

This invention relates to improvements in the front heads of the drill cylinders of rock drills. It is characterized by a split bushing which is made in two halves, an upper and a lower. The lower half has a shoulder formed therewith to enable a spring to bear between said shoulder and neck of the front head. A packing nut engages a tapered end of the said lower half of the bushing and the threaded neck of the front head. The tension spring locks the nut with the said threaded neck, and thereby prevents said nut unscrewing by reason of the jars of the drill cylinder consequent to its use. The spring also ejects the lower half of the split bushing when the packing nut is detached from the head.

Figure 1 represents a drill cylinder with the improved front head bolted thereto, Fig. 2 shows an enlarged axial section of the front head with the piston of the drill cylinder, Fig. 3 is a top plan view of the head shown in Fig. 2 and Fig. 4 shows a section of Fig. 2 on the line 4, 4.

In the drawings the numeral 20 indicates a drill cylinder, with the piston rod 21, and drill chuck 22. The front end of the cylinder is shown to comprise a head generally designated as the front head, which has the body 23, and neck 24 with the threads 25. Lugs 26 with the openings 27 extend from the body 23 and bolts 28 secure the front head to the cylinder 20. The head 23 is shouldered at 30 for the upper half of a split bushing that comprises the longitudinal members 31 and 32. A shoulder 33 in each of said members is formed flush with the lower face 34 of the head, so that the projecting portions of the members 31 and 32 can enter the bore of the cylinder 20 and thereby aline the head. The lower half of the split bushing in said head is shown to comprise the longitudinal members 40 and 41 which terminate in the tapering shouldered ends 42, 43. Annular grooves are formed in the members 40 and 41 for the packing 44. Steam packing 45 or an air packing is located between the accompanying ends of the upper and lower half of the split bushing. A spring 48 bears between the upper edge of the neck of the front head and the shoulder of the ends 42, 43. A packing nut 50 is in threaded engagement with the neck 24 of the head and has tapered opening 51 which registers with the tapered faces of the ends 42, 43. By screwing down the packing nut the packing 45 is firmly held in place. The spring 48 by bearing against the shouldered ends 42, 43 tends to lock the packing nut 50 with the threads 25 of the neck 24. When the said packing nut is removed from the neck 24 the spring 48 ejects the members 40 and 41 from the front head.

Having described the invention what I desire to secure by Letters Patent and claim is:—

1. In a front end for cylinders the combination of a head, a split bushing in said head, a packing nut supported on the head and engaging said bushing and flexible means to lock the nut with said head.

2. In a front end for cylinders the combination of a head, a split bushing in said head, separated halves in the bushing, packing between said halves, a neck formed with the head, a packing nut supported on said neck and registering with one of said halves of the bushing and a spring bearing between the latter half and the end face of the neck.

3. In a front end for cylinders the combination of a head, a split bushing in said head, separated halves in the bushing, a tapered shouldered end for one of said halves, a neck formed with the head, a packing nut in threaded engagement with said neck and also in engagement with said tapered shouldered end, and a spring bearing between said neck and said shouldered end to lock the nut in place.

4. In a front end for cylinders the combination of a head, a neck formed with the head, a split bushing in said head, a shouldered end formed with said bushing, a packing nut supported on the neck and engaging the said shouldered end and a flexible medium between said shouldered end and the end face of said neck.

5. In a front end for cylinders the combination of a head, a neck formed with the head, a split bushing in the neck, a tapered shouldered end formed with the bushing, a packing nut with a tapered opening in threaded engagement with said neck and in register with the tapered shouldered end of the bushing and a spring bearing between the said neck and the said tapered end of the bushing.

6. In a front end for cylinders the combination of a head, a neck formed with the head, a bushing in said neck, an upper half and a lower half for said bushing, a pair of longitudinal members for each half, a packing nut in adjustable engagement with the said neck and also in engagement with the longitudinal members of said lower half of the bushing, and a flexible medium bearing between the neck and said lower half.

Signed at borough of Manhattan in the county of New York and State of New York this 6th day of April A. D. 1910.

GEORGE S. POWER.

Witnesses:
A. A. DE BONNEVILLE,
MARTIN ZIMANSKY.